(12) United States Patent
Hou et al.

(10) Patent No.: US 10,416,365 B2
(45) Date of Patent: Sep. 17, 2019

(54) OPTICAL ARRANGEMENT FOR CAMERA MODULES, CAMERA MODULES WITH OPTICAL ARRANGEMENTS, AND METHOD OF MANUFACTURE

(71) Applicant: SCHOTT Glass Technologies (Suzhou) Co. Ltd., Jiangsu (CN)

(72) Inventors: Dengke Hou, Jiangsu (CN); Fan Chen, Jiangsu (CN); Ralf Biertuempfel, Mainz-Kastel (DE)

(73) Assignee: SCHOTT Glass Technologies (Suzhou) Co. Ltd., Mainz (DE)

( * ) Notice: Subject to any disclaimer, the term of this patent is extended or adjusted under 35 U.S.C. 154(b) by 106 days.

(21) Appl. No.: 15/492,022

(22) Filed: Apr. 20, 2017

(65) Prior Publication Data
US 2017/0219749 A1 Aug. 3, 2017

Related U.S. Application Data

(63) Continuation of application No. PCT/CN2014/088968, filed on Oct. 20, 2014.

(51) Int. Cl.
*G02B 5/20* (2006.01)
*G03B 11/00* (2006.01)
(Continued)

(52) U.S. Cl.
CPC .......... *G02B 5/208* (2013.01); *B29D 11/0073* (2013.01); *B29D 11/00634* (2013.01); *G02B 1/11* (2013.01); *G02B 3/00* (2013.01); *G02B 5/223* (2013.01); *G02B 5/226* (2013.01); *G02B 5/26* (2013.01); *G02B 5/282* (2013.01);
(Continued)

(58) Field of Classification Search
None
See application file for complete search history.

(56) References Cited

U.S. PATENT DOCUMENTS 8,014,080 B1    9/2011 Chen
2005/0094275 A1*  5/2005 Ikuhara ............... C09D 125/10
                                                         359/586
(Continued)

FOREIGN PATENT DOCUMENTS

CN    103359938    10/2013
CN    103923438    7/2014

OTHER PUBLICATIONS

International Search Report dated Jul. 17, 2015 for corresponding PCT/CN2014/088968.
(Continued)

*Primary Examiner* — Darryl J Collins
*Assistant Examiner* — Journey F Sumlar
(74) *Attorney, Agent, or Firm* — Ohlandt, Greeley, Ruggiero & Perle, L.L.P.

(57) ABSTRACT

An optical arrangement for a camera module with an image sensor is provided. The optical arrangement includes optical components having a transparent cover element; an infrared absorbing cut-off filter; and an optical lens. The optical components are arranged, along an incident optical beam path going through the optical components onto the image sensor, in a sequence through the transparent cover element, then the infrared absorbing cut-off filter, and then the optical lens.

13 Claims, 2 Drawing Sheets

(51) Int. Cl.
| | |
|---|---|
| *G02B 1/11* | (2015.01) |
| *G02B 5/22* | (2006.01) |
| *G02B 5/28* | (2006.01) |
| *B29D 11/00* | (2006.01) |
| *G02B 3/00* | (2006.01) |
| *G02B 5/26* | (2006.01) |
| *G02B 1/02* | (2006.01) |

(52) U.S. Cl.
CPC ...... *G03B 11/00* (2013.01); *B29K 2995/0026* (2013.01); *G02B 1/02* (2013.01)

(56) References Cited

U.S. PATENT DOCUMENTS

| | | | |
|---|---|---|---|
| 2012/0147250 A1 | 6/2012 | Tsai | |
| 2013/0264672 A1 | 10/2013 | Schreder | |
| 2013/0286470 A1 | 10/2013 | Chien | |
| 2014/0132831 A1 | 5/2014 | Kim | |
| 2015/0077629 A1* | 3/2015 | Jeong | H04N 5/2254 348/374 |
| 2015/0260889 A1* | 9/2015 | Shiono | C08K 5/3417 252/587 |
| 2015/0293284 A1* | 10/2015 | Tatemura | G02B 5/283 359/359 |

OTHER PUBLICATIONS

Written Opinion dated Jul. 17, 2015 for corresponding PCT/CN2014/088968.

International Preliminary Report on Patentability dated Apr. 25, 2017 for corresponding PCT/CN2014/088968, 5 pages.

\* cited by examiner

Prior Art

OPTICAL ARRANGEMENT FOR CAMERA MODULES, CAMERA MODULES WITH OPTICAL ARRANGEMENTS, AND METHOD OF MANUFACTURE

CROSS REFERENCE TO RELATED APPLICATIONS

This application is a continuation of International Application No. PCT/CN2014/088968 filed on Oct. 20, 2014, the entire of contents of which are incorporated by reference herein.

BACKGROUND

1. Field of the invention

The present invention relates to an optical arrangement for a camera module, a camera module with the optical arrangement and a method of manufacturing the optical arrangement.

2. Description of Related Art

In contrast to a human eye, a camera sensor such as a CMOS (Complementary Metal-Oxide-Semiconductor) or CCD (Charge-coupled Device) image sensor is typically also sensitive to infrared (IR) light. Thus, infrared light components may cause defects in the recorded image due to aberrations in color and brightness.

To eliminate or reduce errors caused by IR light in the displayed image, an IR-cut-off filter is often disposed between the imaging lens and the image sensor, so that IR light is blocked while visible light is transmitted to the image sensor. However, the use of an IR-cut-off filter requires additional space between the sensor and the objective lens and therefore a larger back focal length (BFL). This may increase the thickness of the camera module. Above that, the spatial proximity of the filter to the image sensor requires a good surface finish of the filter, as light ray distortions would be mapped to the nearby image plane and thus may be visible in the recorded images. If using infrared absorbing glasses as infrared filter, another problem arises due to the typically low mechanical stability. Drop tests have shown that a thin infrared absorbing glass filter in the camera module can easily be broken.

US 2014/0043677 A1 discloses an infrared-cut (IR-cut) filter including a substrate and an IR-cut film coated on the substrate. The IR-cut consists of thirty-two high-refractive layers and thirty-two low-refractive layers alternately stacked on the substrate. The first high-refractive layer is in contact with the substrate and the first low-refractive layer is coated on the first high-refractive layer.

US 2013/0286470 A1 discloses an IR-cut filter and a lens module including the IR-cut filter. The IR-cut filter includes a substrate made of sapphire and a film formed on the substrate. The film is configured to increase the IR reflectivity of the substrate and is coated on the substrate, the film including a number of high refractive index layers and a number of low refractive index layers alternately stacked on the substrate.

US 2012/0261550 A1 discloses an optical lens assembly with a filter member for image taking, sequentially arranged from an object side to an image side along an optical axis. The filter member can filter infrared light and comprises a glass that can absorb infrared light.

SUMMARY

It is an object of the invention to provide an optical arrangement for a camera module, the optical arrangement filtering infrared light, having a reduced space requirement and having an improved mechanical strength and improved optical performance.

In accordance with one aspect, the invention relates to an optical arrangement for a camera module, wherein the camera module includes an image sensor. The optical arrangement comprises a plurality of optical components. The optical components comprise: a) a transparent cover element, b) an infrared absorbing cut-off filter or absorption IR-cut filter, and c) an objective lens. As compared with an infrared reflecting interference filter, the absorption IR-cut filter has the advantage that its optical properties are nearly not dependent of the viewing angle or of the angle of incident light. In particular, an infrared absorbing cut-off filter according to the invention has a high absorption in the near infrared range with wavelengths above 800 nm (preferably a transmission of less than 0.1 in the range between 800 and 1100 nm) and has a high transmission in the visible range (preferably an average transmission of at least 0.2, more preferably at least 0.5 in the visible wavelength range from 380 nm to 780 nm).

The objective lens may be a single optical lens or a lens assembly comprising several optical lenses. The optical components a), b), c) are arranged, along an incident optical beam path going through the optical components onto the image sensor, in a sequence a) to c).

In accordance with another aspect, the invention relates to a camera module comprising the optical arrangement.

In accordance with another aspect, the invention relates to a method of manufacturing the optical arrangement. The method comprises: providing a transparent cover element, preferably made of a chemically strengthened glass or sapphire; producing a protective IR filter by adding an infrared absorbing cut-off filter, preferably an infrared absorbing filter glass element (e.g. a filter glass sheet or substrate) or an infrared absorbing layer (e.g. an organic ink or film), to the cover element, the infrared absorbing cut-off filter thus covering a rear face of the cover element; providing an objective lens; and arranging, along an incident optical beam path going onto the image sensor, the objective lens at a position between the protective IR filter and the image sensor, a front face of the cover element being exposed to the incident optical beam.

The cut-off filter can comprise a substrate wherein a filter layer is arranged on at least one side of the substrate, the filter layer comprising a matrix containing at least one organic dye or pigment dissolved in the matrix. The organic dye can be soluble in a conventional solvent.

The preferred dye is long-term thermally stable until at least 140° C. and can withstand a short-term thermal stress of 150° C. to 300° C., preferably 200° to 270° C. Under "long-term" can be understood a period of more than 60 min, preferably at least 100 hours. Under "short-term" can be understood a period of not more than 60 min, preferably not more than 30 min.

The organic dye is preferably selected from a group consisting of azoic dyes, polymethin dyes, cyanine dyes, tripheny-methane dyes, carbonyl dyes: Anthrachinone, indigo, porphyrine and phthalocyanine, wherein phthalocyanine and porphyrine is preferable.

The selected dye depends on the relevant wavelength range. For a blue filter or an IR cut filter, a blue-green dye can be used.

At least one dye is dissolved in the matrix. The matrix preferably consists of a binder, which is a substance that holds other materials together to form a cohesive whole mechanically, chemically, or as an adhesive. As a binder can be used compounds having the required film-formation properties, such as plastics or polymers with a sufficient polymer weight. Alternatively, the matrix can be formed in situ by crosslinking and/or polymerisation reactions, after coating the substrate.

The binder can be a polyurethane resin, sol-gel compound, hybrid polymer, silicone (curing resp. cross-linking organically and/or inorganically), phenolic resin, epoxy, polyamide, polyimide, EVA (ethylene vinyl acetate) resin, polyester resin, or a mixture thereof.

Herein, the front face of the cover element is opposed to the rear face. In other words, the protective IR filter comprises the cover element and the infrared absorbing cut-off filter, the protective IR filter being arranged so that the infrared absorbing cut-off filter faces the objective lens. It is thus arranged between the cover element and the objective lens.

When taking an image of an object with the camera module, the optical arrangement is traversed by the incident optical beam path. In this, the beam path is the sum of all ray paths that go through the optical components, onto the image sensor, thus being the sum of all ray paths that contribute to the object image to be generated. The optical components are aligned with the image sensor in a manner that light directed to the image sensor of the camera has to pass through the optical components of the optical arrangement.

Above mentioned sequence a) to c) means that the beam path going through a camera aperture first passes through the transparent cover element, then passes through the infrared absorbing cut-off filter, and then passes through the objective lens, by which the beam path is directed onto the image sensor.

The sequence a) to c) enables an effective reduction of the total length of the optical arrangement, thus allowing a small and compact design of the camera module, especially a miniaturized camera module, which can be part of a smartphone. Having in mind that each smartphone is designed to comprise a camera module, wherein smartphones generally have extreme exigencies with regard to reducing the space requirements of the used components, the present optical arrangement is extremely well suited for use in a smartphone or generally in a miniaturized camera module.

In one embodiment, the cover element can be formed as a sheet made of a material with a hardness of at least 7 on Woodell's scale. Preferably, the material is one of: sapphire, spinel, aluminium oxynitride, moissanite, corundum, quartz. To improve mechanical durability, as well, chemically strengthened glass may be used for the cover element.

In a preferred embodiment, the infrared absorbing cut-off filter and the cover element can be combined to a protective IR filter composed of a filter film which is arranged on a rear face of the cover element. In this document, front face and rear face of an optical element are defined with respect to the incident optical beam path, which traverses the optical element by entering the front face and exiting the rear face of the optical element. The protective IR filter is a two layered material that can be formed i) as a laminate material, or ii) as a coated material, wherein the infrared absorbing filter film is coated on the cover element. It is preferred to cement the cover element to the infrared absorbing cut-off filter, e.g. by using a suitable epoxy resin as optical cement.

However, the infrared absorbing cut-off filter and the cover element can as well be separately arranged, spaced from each other or not laminated together.

If the cover element is made of a material with a high hardness, preferably at least 7 on Woodell's scale, and/or of a chemically strengthened glass, the protective IR filter and the whole optical arrangement have a high mechanical strength. Especially the fact that the front face of the cover element, which has a high hardness, is placed at the outer surface of the optical arrangement or camera module towards the outer space gives the optical arrangement an improved mechanical strength and high resistance against external impacts. This marks the difference over known arrangements, wherein an infrared cut-off filter is placed on the outer surface of a cover element; such arrangements are much more vulnerable against external impacts.

The infrared absorbing cut-off filter can be designed as an infrared absorbing filter glass element, preferably as a pane, film or sheet.

Herein, the infrared absorbing cut-off filter, preferably a filter glass element can have a thickness of less than 0.3 mm, preferably less than 0.25 mm or 0.21 mm. With the invention, thinner glasses (with a higher content of IR-absorbing ions, particularly Cu-ions) may be used, since the glass is mechanically stabilized by the laminated cover element.

According to a further embodiment, the infrared absorbing cut-off filter may also be an inorganic or organic coating, comprising a matrix and a coloring component in the matrix. The coloring component may be dissolved in the matrix or it may be composed of small particles (pigments).

Pigments preferably have a particle size of less than 1 µm to avoid scattering. Pigments having a primary particle diameter of from 2 to 5000 nm, preferably 8 to 1000 nm, most preferably 10 to 500 nm are preferred.

Preferred organic coloring components are organic dyes such as azo dyes, polymethine dyes, cyanine dyes, triphenylmethane dyes, carbonyl dyes such as antrachinones, indigo, phorphyrins and phthalocyanines, whereas phorphyrins and phthalocyanines are preferred.

The coloring components are embedded or dissolved in an inorganic or organic matrix. As an inorganic matrix a sol-gel matrix is preferred. An organic matrix can be selected from the group consisting of polyurethane resins, hybrid polymers, silicones (with organic and/or inorganic crosslinking), phenol resins, epoxides, polyamides, polyimides, EVA (ethylene vinyl acetate), polyester resins and mixtures and copolymers thereof. A matrix selected from a sol-gel matrix and a polyurethane matrix is preferred.

The coating preferably has a thickness of less than 100 µm, preferably less than 20 µm and according to a specific embodiment less than 15 µm. The coating preferably is at least 0.1 µm, more preferably at least 0.5 µm and most preferably at least 1 µm thick. According to other embodiments the coating may be at least 2 µm thick.

The organic or inorganic coating may be applied by coating techniques such as spin coating, spray coating, dip coating, casting, screen printing, doctoring, ink jet printing, pad printing, roll coating, spread coating or the like. Spin-coating is particularly preferred.

With an infrared absorbing cut-off filter made of infrared absorbing filter glass, reflections of infrared light rays within the camera module are effectively reduced. This way, the cut-off filter made of infrared absorbing filter glass lowers or eliminates the flare phenomenon effectively.

The infrared absorbing filter glass element can be made from a glass containing copper ions. The copper ions absorb infrared light. Advantageously, copper containing glass which has a significant absorption at least in the near infrared range adjacent to the visible spectral range, has a low dispersion. A copper ion containing glass typically has a blue appearance. These glasses are therefore also referred to as blue glasses.

However, suitable infrared absorbing filter glasses such as blue glass may contain streaks, in the art also known as schlieren. To reduce the schlieren effect, the use of phosphate glasses, especially fluorophosphate glasses, is advantageous. Fluorophosphate glasses may be preferred because it has been found that fluorophosphate glasses have a higher corrosion resistance than phosphate glasses. This is relevant in case the filter glass is not well enough protected from environmental influences by the other optical components. However, phosphate glasses or generally glasses which are sensitive to moisture may be employed as well, particularly if the camera module or at least the the protective IR filter is sealed. In this regard, the cover element also encapsulates the filter glass element and thus protects the filter glass from moisture.

Phosphate glasses, herein, refer to optical glasses in which $P_2O_5$ functions as a glass former and is present in the glass as a major component. When replacing a portion of the phosphate in a phosphate glass by fluorine, fluorophosphate glasses are obtained. For the synthesis of fluorophosphate glasses, instead of oxide compounds such as $NaO_2$, the corresponding fluorides such as NaF are added to the glass batch.

A phosphate glass or a fluorophosphate glass can be very suitable for the IR-cut filter, in view of a low schlieren optical component. CuO-doped fluorophosphate glasses with different CuO concentrations and hence different absorption properties include, for example, the glasses BG60, BG61, or as phosphate glasses, BG39, BG18, BG55 of SCHOTT AG.

However, especially in glasses containing copper ions, schlieren may be formed in the manufacturing process of the glass. Schlieren represent local variations in chemical composition and thus also cause a local change of the refractive index of the glass. Associated therewith are distortions of the wavefronts and corresponding deflections of light rays.

In one embodiment, the protective IR filter comprises an IR reflecting coating which is arranged, or preferably formed as a coating, on one face of the cover element, or optionally on one face of the infrared cut-off filter. The IR reflecting coating may comprise, for example, a multi-layer structure.

A combined use of IR reflecting and IR absorption filter has the advantageous effect of enabling the use of a thin infrared absorbing filter element such as a thin pane or layer of an infrared absorbing filter glass (e.g. a blue glass), thus effectively decreasing the schlieren effect and the dependence of impurities or surface roughness in blue glass. Above that, the combined use improves the filter characteristics as compared with using only one filter: steeper curve (i.e. a steeper cut-off edge in the transmission spectrum of the filter), higher filter attenuation—in short, increase the strength of the IR-cut filter.

In one embodiment, the protective IR filter can comprise at least one antireflection layer which is arranged, or preferably formed as a coating, on one face of the cover element, or optionally on one face of the infrared cut-off filter.

BRIEF DESCRIPTION OF THE DRAWINGS

The invention will now be described in more detail by way of exemplary embodiments and with reference to the accompanying drawings. In the drawings, the same reference numerals designate the same or corresponding elements. In the drawings.

DETAILED DESCRIPTION

Figure 1:
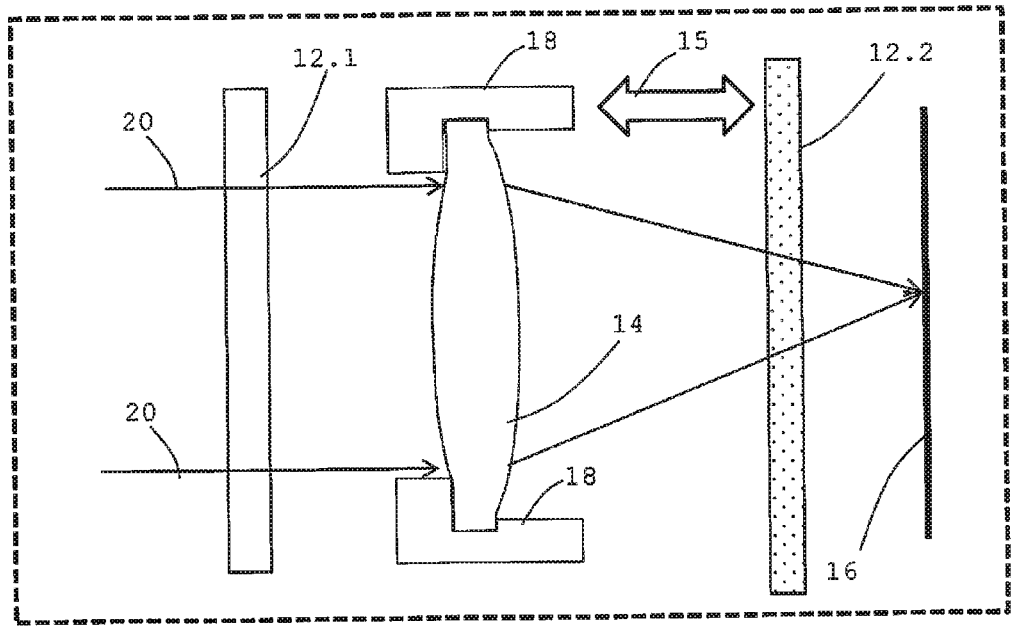
FIG. 1 illustrates a prior art example.

FIG. 1 shows a prior art example of a filter arrangement. Herein, the following optical components are arranged, along an incident optical beam path 20 going through the optical components onto an image sensor 16: First a transparent cover element 12.1, then a lens 14, and then an infrared absorbing cut-off filter 12.2.

In this example, a range 15 in which the lens 14 is allowed to displace for autofocus is limited by the cut-off filter 12.2. Above that, the cut-off filter 12.2 is not allowed to be thin, otherwise a desired level of IR absorption and mechanical filter strength cannot be ensured.

Figure 2:
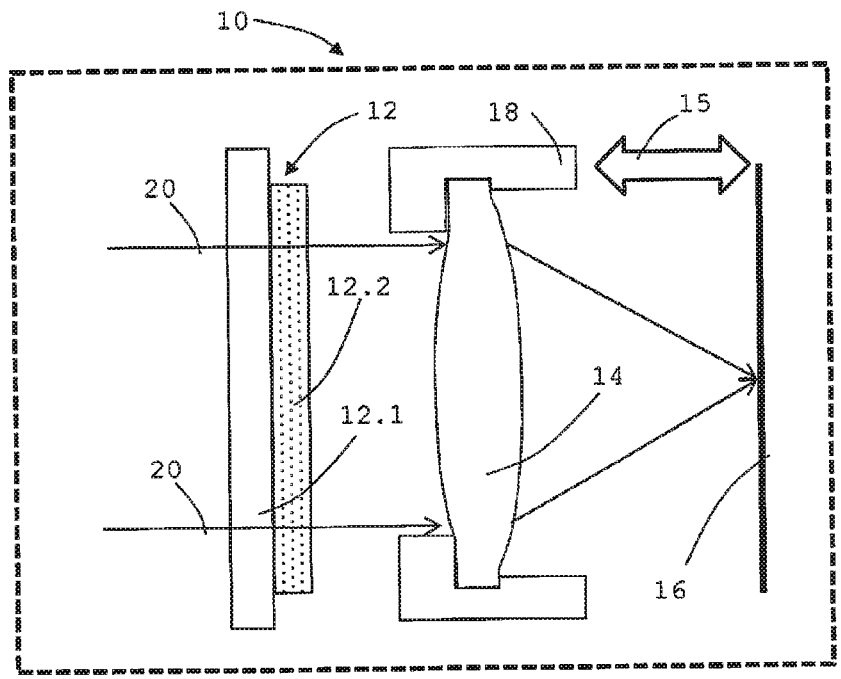
FIG. 2 illustrates an optical arrangement for a camera module with an image sensor according to the invention.

FIG. 2 shows an optical arrangement 10 according to the invention. The optical arrangement 10 is adapted for a camera module 22 (see FIG. 2) with an image sensor 16.

The optical arrangement 10 comprises a plurality of optical components. The optical components comprise: a) a transparent cover element 12.1, b) an infrared absorbing cut-off filter 12.2, and c) an objective lens 14 fixed in a holder 18. The optical components a), b), c) are arranged, along an incident optical beam path 20 going through the optical components 12.1, 12.2, 14 onto the image sensor 16, in a sequence a) to c).

When taking a picture of an object outside the camera module 22 with the camera module 22, the optical arrangement 10 is traversed by the incident optical beam path 20. The optical components 12.1, 12.2, 14 are aligned with the image sensor 16 in a manner that light directed to the image sensor 16 of the camera has to pass through the optical components 12.1, 12.2, 14 of the optical arrangement 10.

The infrared absorbing cut-off filter 12.2 and the cover element 12.1 are combined to a protective IR filter 12 composed of a filter film on a rear face of the cover element 12.1, the protective IR filter 12 being a two layered material formed as a laminate material. Preferably, the infrared absorbing cut-off filter 12.2 and the cover element 12.1 are cemented together. This way, the infrared absorbing cut-off filter 12.2 is effectively stabilized and a low step in refractive index is achieved at the interfaces of the elements facing each other.

As compared with the range 15 in which the lens 14 in a prior arrangement (FIG. 1) is allowed to displace for autofocus, the space 15 available for auto focus lens movement is substantially larger.

FIG. 3a-3d shows protective IR filter embodiments with different arrangements of IR reflecting, antireflection and hybrid layers. The embodiments comply each with one of the following structuring principles, wherein the protective IR filter 12 comprises:

an IR reflecting layer 12.3 which is arranged, or preferably formed as a coating, on one face of the cover element 12.1, or optionally on one face of the infrared absorbing cut-off filter 12.2, or an antireflection layer 12.4 which is arranged, or preferably formed as a coating, on one face of the cover element 12.1, or optionally on one face of the infrared absorbing cut-off filter 12.2, or a hybrid IR reflecting and antireflection layer 12.5 which is arranged, or preferably formed as a coating, on one face of the cover element 12.1, or optionally on one face of the infrared absorbing cut-off filter 12.2.

Figures 3A, 3B, 3C, 3D:
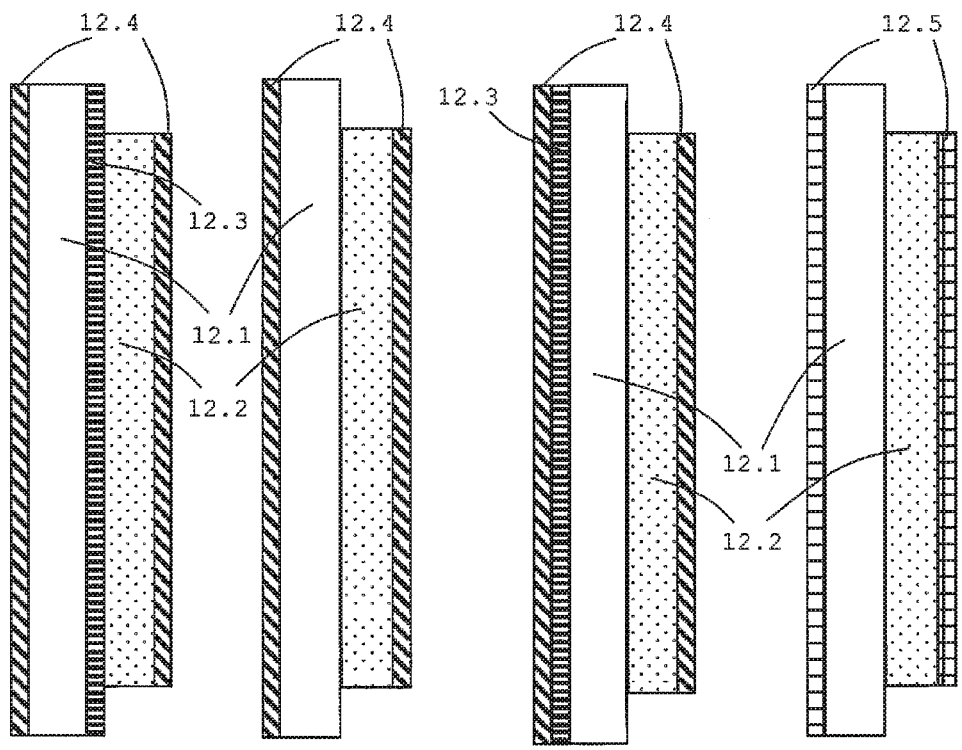
FIG. 3a-3d illustrates protective IR filter embodiments with different arrangements of IR reflecting, antireflection and hybrid layers.

In FIG. 3a, the protective IR filter 12 comprises: an IR reflecting layer 12.3, which is arranged on the rear face of the cover element 12.1 by laminating the IR reflecting layer 12.3 with the cover element 12.1; an antireflection layer 12.4 which is arranged on the front face of the cover element 12.1 by laminating the antireflection layer 12.4 with the cover element 12.1, and an antireflection layer 12.4 which is arranged on the rear face of the infrared absorbing cut-off filter 12.2 by laminating the antireflection layer 12.4 with the antireflection layer 12.4.

In FIG. 3b, the protective IR filter 12 comprises: an antireflection layer 12.4 which is coated on the front face of the cover element 12.1, and an antireflection layer 12.4 which is coated on the rear face of the infrared absorbing cut-off filter 12.2.

In FIG. 3c, the protective IR filter 12 comprises: an IR reflecting layer 12.3, which is coated on the front face of the cover element 12.1; an antireflection layer 12.4 which is arranged on the front face of the cover element 12.1 by coating the cover element i) with the IR reflecting layer 12.3, and ii) then coating the same with the antireflection layer 12.4, and an antireflection layer 12.4 which is deposited on the rear face of the infrared absorbing cut-off filter 12.2.

In FIG. 3d, the protective IR filter 12 comprises: a hybrid IR reflecting and antireflection layer 12.5 which is coated on the front face of the cover element 12.1, and a hybrid IR reflecting and antireflection layer 12.5 which is coated on the rear face of the infrared absorbing cut-off filter 12.2.

As also shown in the exemplary embodiments of FIGS. 3a to 3d, both the cover element 12.1 and the infrared absorbing filter element 12.2 are preferably panes, or disks, respectively, having coplanar faces. Thus, the protective filter element 12 as a whole does not alter or influence the focal length of the optical assembly.

Figure 4:
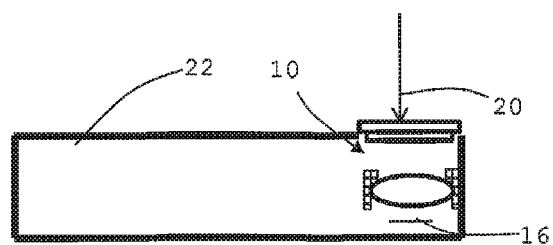
FIG. 4 illustrates a camera module comprising the optical arrangement.

FIG. 4 shows a smart phone or tablet PC with a camera module 22, comprising the optical arrangement 10. An incident optical beam path 20 enters the optical arrangement 10 at the front face of the transparent cover element 12.1 (see also FIG. 1) and, after passing through the optical arrangement 10, it is directed to the image sensor 16 of the smartphone 22.

Manufacturing the optical arrangement 10 comprises: laminating an infrared absorbing cut-off filter 12.2 made of blue glass with a transparent cover element 12.1 made of sapphire to obtain a protective IR filter 12 with a mechanical strength which is improved as compared with the strength of a simple blue glass filter; performing antireflection (AR) and IR-cut coating, separately on both surfaces of the protective IR filter 12, thus i) improving IR-cutoff characteristics by making the IR-cutoff edge in the transmission spectrum steeper, and ii) saving costs for coating on the camera cover glass and for the holder gluing process; arranging the protective IR filter 12 in front of the lens assembly 14, thus increasing the space available for auto focus lens movement and/or decreasing the camera module 22 thickness.

Locating the protective IR filter 12 in front of the lens assembly 14 also improves the optical performance. As the distance of the filter to the image plane of the sensor is increased, defects on the filter surface are not mapped to the image plane and thus are not visible in the recorded image.

As compared with the arrangement of FIG. 2, in a prior arrangement such as that of FIG. 1, the IR-cut filter is positioned between the optical sensor and the lens assembly. Such a structure requires additional space for the IR-cut filter in the imaging system, thereby increasing the minimal back focal length. This in turn increases the thickness of the camera module 22. As well, defect on the surface of the IR-cut filter may be visible in the image, due to the spatial proximity of the IR-cut filter to the image sensor. Further, in such an assembly, the IR-cut filter can easily be broken during drop tests.

As an additional effect of the invention, the camera module may have a shorter minimum back focal length compared to state of the art camera modules used in smart phones or tablet PCs. This may be used to increase the zoom range of an objective lens being set up as a zoom objective lens. Further, the distance of the objective lens to the sensor may be smaller than in existing camera modules that employ infrared absorbing cut-off filters as a shorter back focal length may be chosen. Thus, according to one embodiment of the invention, the back focal length of the objective lens may be 3.6 mm or less. In other words, the back focal length of objective lens (minimum autofocus back focal length) can be designed shorter, for example to a range of 0.3 to 0.5 mm, which is less than a conventional range of 0.6 to 0.9 mm back focal length configured with a conventional arrangement, wherein the IR-cut filter is between objective lens and imaging sensor. In case of an objective lens having a variable back focal length, this value of 3.6 mm at the most refers to the minimum back focal length.

As compared with prior arrangements, the optical arrangement 10 of the invention has a multitude of benefits: Lower costs for coating since the optical assembly according to the invention has fewer surfaces as an assembly with the infrared filter positioned at a distance to the image sensor and between sensor and objective lens; Increased mechanical stability of the protective IR absorbing filter 12, as the filter element is supported by the cover element; Decreased thickness of the camera module 22, based on the increased room for manoeuvre for the back focal length in the objective lens design; Improved optical performance, since defects on the filter surface are not imaged to the sensor.

REFERENCE SIGNS 10 optical arrangement
12 protective IR filter
12.1 cover element
12.2 infrared cut-off filter
12.3 IR reflecting layer
12.4 antireflection layer
12.5 hybrid antireflection and IR reflecting layer
14 objective lens
15 lens displacement range for autofocus
16 image sensor
18 lens assembly holder
20 incident optical beam path
22 camera module, smartphone

What is claimed is:

1. An optical arrangement for a camera module with an image sensor, comprising a plurality of optical components having an incident optical beam path towards the image sensor, the plurality of optical components comprising a first antireflection layer arranged on one face of a transparent cover element, an IR reflecting layer arranged on an opposite face of the cover element, a near infrared absorbing cut-off filter on the IR reflecting layer, a second antireflection layer arranged on the cut-off filter, and an optical lens, the plurality of optical components being arranged, along the incident optical beam, in a sequence from the cover element to the cut-off filter, then to the optical lens, and then to the image sensor.

2. A camera module, comprising a camera module with an optical arrangement and an image sensor, the optical arrangement comprising a plurality of optical components having an incident optical beam path towards the image sensor, the plurality of optical components comprising a transparent cover element, a near infrared absorbing cut-off filter, and an optical lens, the plurality of optical components being arranged, along the incident optical beam, in a sequence from the cover element to the cut-off filter, and then to the optical lens, wherein the optical lens is an objective lens having a minimum back focal length of 3.6 mm.

3. The optical arrangement according to claim 2, wherein the cover element is formed as a sheet made of a material selected from the group consisting of sapphire, chemically strengthened glass, spinel, aluminium oxynitride, moissanite, corundum, and quartz.

4. The optical arrangement according to claim 2, wherein the cut-off filter is formed as a near infrared absorbing filter glass element.

5. The optical arrangement according to claim 4, wherein the near infrared absorbing filter glass element comprises a filter glass sheet or substrate.

6. The optical arrangement according to claim 5, wherein the near infrared absorbing filter glass element comprises blue glass or an infrared absorbing layer made of an organic ink or organic film.

7. The optical arrangement according to claim 2, further comprising an IR reflecting layer.

8. The optical arrangement according to claim 7, wherein the IR reflecting layer is arranged on the opposite face of the cover element between the cover element and the cut-off filter.

9. The optical arrangement according to claim 7, wherein the IR reflecting layer is arranged on the one face of the cover element between the cover element and the first antireflection layer.

10. The optical arrangement according to claim 2, wherein the cut-off filter has a thickness of less than 0.3 mm.

11. The optical arrangement according to claim 2, wherein the cover element and the cut-off filter are cemented together.

12. A camera module comprising the optical arrangement according to claim 2.

13. The camera module according to claim 12, wherein the optical lens is an objective lens having a minimum back focal length of 3.6 mm.

* * * * *